No. 783,502. PATENTED FEB. 28, 1905.
J. & W. BLACK.
CLAMP OR VISE.
APPLICATION FILED FEB. 9, 1903. RENEWED JULY 18, 1904.
2 SHEETS—SHEET 1.
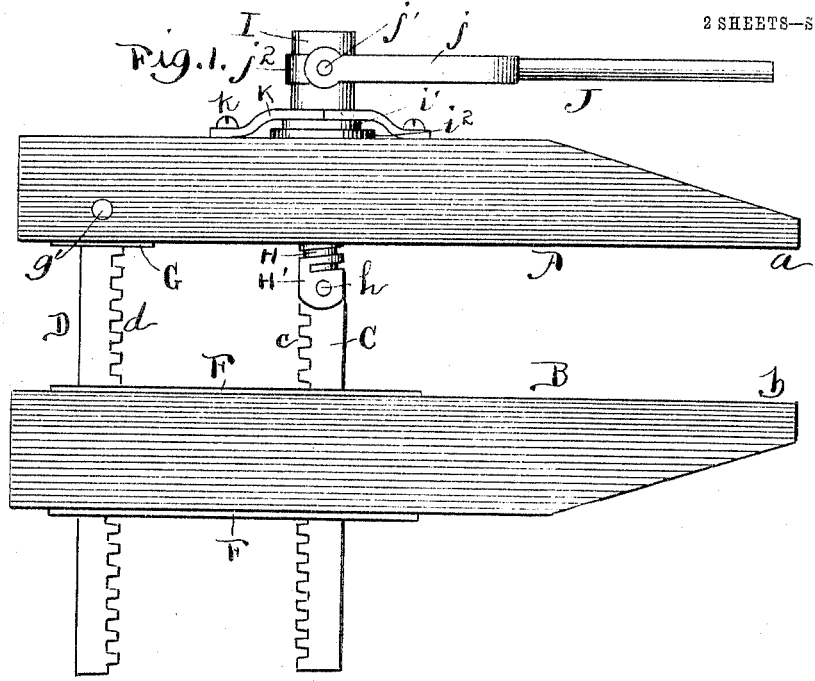
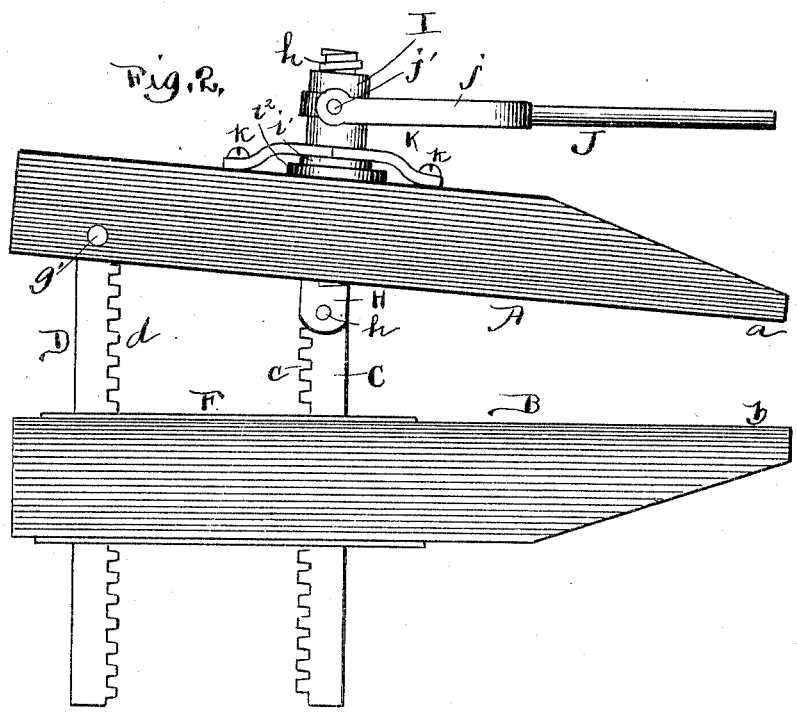
Witnesses
Samuel W. Banning,
Pierson W. Banning.
Inventors
John Black and William Black
By Banning & Banning
Attys.

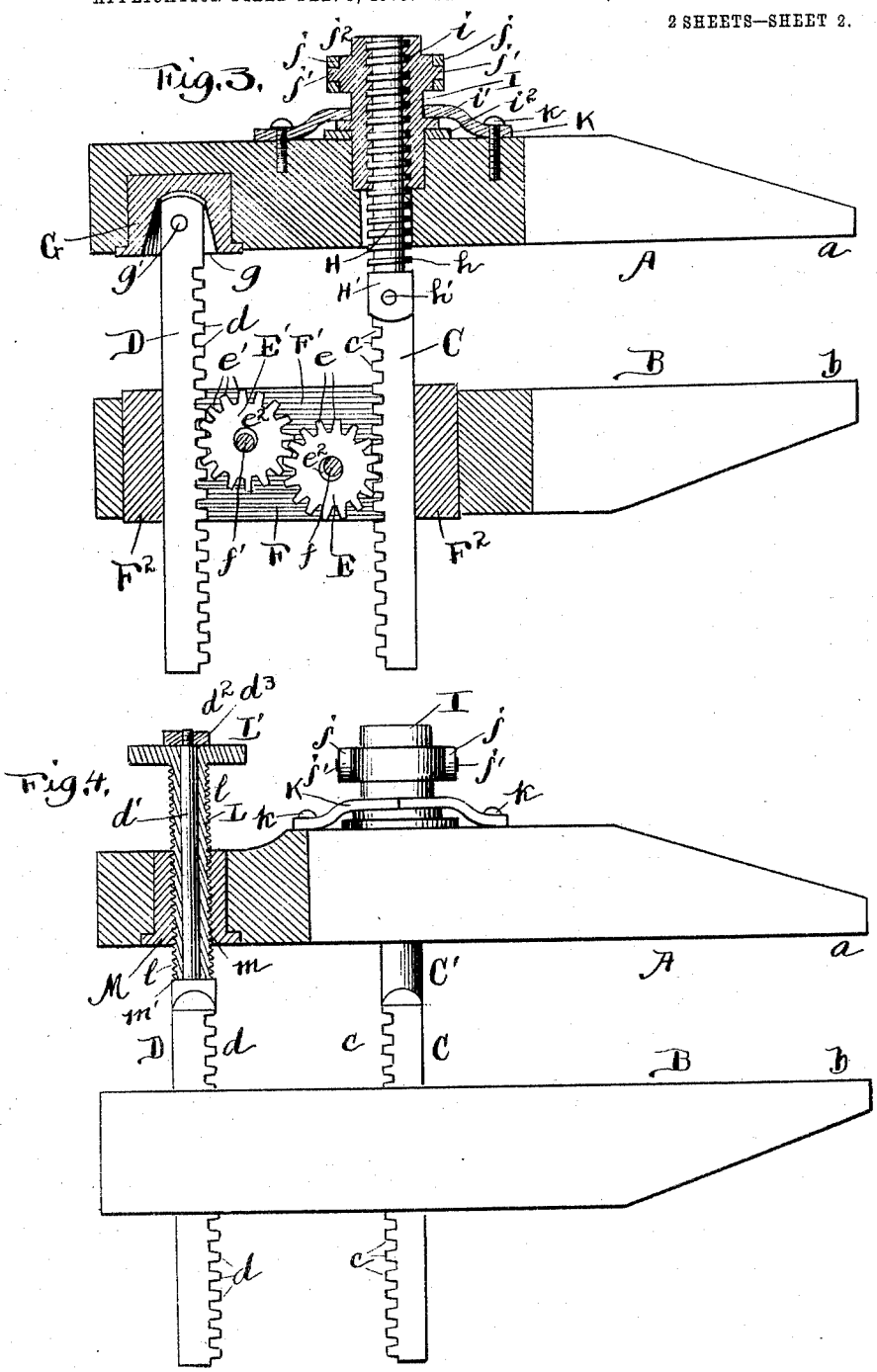

No. 783,502.

Patented February 28, 1905.

UNITED STATES PATENT OFFICE.

JOHN BLACK AND WILLIAM BLACK, OF MENDOTA, ILLINOIS.

CLAMP OR VISE.

SPECIFICATION forming part of Letters Patent No. 783,502, dated February 28, 1905.

Application filed February 9, 1903. Renewed July 18, 1904. Serial No. 217,137.

*To all whom it may concern:*

Be it known that we, JOHN BLACK and WILLIAM BLACK, citizens of the United States, residing at Mendota, in the county of Lasalle and State of Illinois, have invented a certain new and useful Improvement in Clamps or Vises, of which the following is a specification.

The object of this invention is to provide a readily-adjustable clamp or vise which may be easily and quickly regulated to meet the requirements of its use, especially in cases where a quick adjustment of the parts is necessary; and the invention more particularly relates to the mechanism by which the jaws are regulated and retracted.

The invention further consists in the features of construction and combinations of parts hereinafter described and claimed.

In the drawings, Figure 1 is a side view of the clamp or vise of this invention, showing the jaws in parallel relation; Fig. 2, a similar view showing the jaws thrown out of parallel; Fig. 3, a view, partly in section, showing the mechanism for controlling the jaws; and Fig. 4, a view, partly in section, of a slightly-modified form of construction.

The vise or clamp is constructed with a movable upper jaw A, having a tapered end $a$, and a fixed lower jaw B, likewise terminating in a tapered end $b$. Between the jaws are two racks C and D, at a suitable distance from one another, provided with teeth $c$ and $d$, respectively, the toothed edges of the two racks being opposite one another, and between the racks and within the body of the lower jaw are two gear-wheels E and E', provided with teeth $e$ and $e'$, respectively, meshing into each other and into the teeth $c$ and $d$ on the racks C and D. These gear-wheels are each provided with holes $e^2$ in their centers, and through the said holes project pivotal pins $f$ and $f'$, respectively, which pins are mounted within a casing F, provided with side walls F' and cross-walls $F^2$, the inner faces of the latter serving as guideways for the smooth or outer faces of the racks as the latter move up and down through the jaw in the course of their operation. The pins $f$ and $f'$ are of a substantially smaller diameter than the holes $e^2$, through which they project, and, furthermore, are located in a line out of perpendicular to the plane of travel of the jaw, whereby a pressure exerted unequally upon the racks will cause the gear-wheels and the respective teeth into which they mesh to bind and the wheels thus thrown off center with respect to their axes by reason of the small diameter of the pins upon which they are mounted as compared with the diameter of the holes in the centers of the gear-wheels. This action not only binds or clamps the teeth of the racks and gear-wheels together, but forces the racks back into contact with the inner faces of the cross-walls $F^2$, firmly clamping the lower jaw against movement with respect to the racks. When, however, an equal pressure is exerted upon the racks, the latter will travel easily up and down and the gear-wheels mesh into each other and into the teeth of the racks without binding or biting, an easy play of the wheels being afforded by reason of the looseness of their pivotal mounting.

The rack D terminates within a socket G, fitted into the movable jaw A and provided with a tapered recess $g$, into which the end of the rack projects and within which it is pivoted by means of a cross-pivotal pin $g'$, which allows the end $a$ of the movable jaw to be moved or oscillated with respect to the rack D.

The rack C has on its end a screw-threaded shaft H, provided with threads $h$, and this shaft terminates in an adjusting head or socket H', into the end of which the rack projects and within which it is pivoted by means of a pin $h'$, allowing the shaft H to be moved with respect to the rack C. The shaft H is mounted within a head I, provided on its interior with suitable screw-threads $i$, with which the screw-threads on the shaft engage, and said head is provided on its exterior with a flange $i'$, which contacts a washer $i^2$, inserted around the adjusting-head and between the flange and the upper face of the movable jaw. Rotation is imparted to the adjusting-head by means of a forked lever J, provided with arms $j$, which are pivotally mounted upon studs $j'$, which project from a band $j^2$, located near the top of the adjusting-head. The adjusting-head is rotatably held in place against withdrawal by means of a split strap K or other suitable means provided with bolts or screws $k$ at it ends, as shown.

A slightly-modified form of clamp is shown in Fig. 4, in which the rack D instead of being pivoted within the socket, as in the clamp hitherto described, terminates in a rod or shaft $d'$, provided on its end with a screw-threaded stud $d^2$, upon which is mounted a nut $d^3$. The rod or shaft is rotatably mounted within a screw-threaded sleeve L, provided with exterior screw-threads $l$ and terminating in an adjusting-wheel L', and the said sleeve is mounted within a socket M, provided with interior screw-threads $m$, engaging the screw-threads L of the sleeve, and the inner end of the sleeve contacts the shoulder $m'$ of the rack, enabling the latter to be adjusted vertically by means of the screw-threaded sleeve, which will travel up and down within the socket as the adjusting-wheel is rotated.

The use and operation of the clamp will be partially understood by the foregoing description, but may be briefly stated as follows: The material to be clamped is placed between the jaws, and the latter are adjusted either in parallel relation to one another or, if so desired, out of parallel relation, as in Fig. 2, which adjustment is accomplished by means of the revolution of the adjusting-head, which causes the screw-threaded shaft to travel up through the adjusting-head, as shown in Fig. 2, while the pivotal mountings of the two racks enable the latter to remain in parallel relation with one another regardless of the angle of the jaws with respect to one another. After the angular relation of the jaws has been determined the movable jaw and the racks attached thereto are shoved down into contact with the material to be clamped without the necessity for the use of screws or other similar appliances. When it is further impossible to contract the jaws by hand, the adjusting-head is rotated by means of the forked lever, which normally would tend to further throw the jaws out of parallel relation to one another, as hitherto described, but such result is prevented by the presence of the object between the jaws, whereupon further revolution of the adjusting-head produces a tension upon the rack C, which tends to raise the gear-wheel E and lower the gear-wheel E', causing the teeth to bind and forcing the racks back against the casing within which they operate, thereby tightening the jaws and clamping the object held between them.

In the clamp or vise of Fig. 4 a certain amount of adjustment can be effected by means of the adjusting-sleeve and wheel, which enables the movable jaw to be tilted slightly up and down, although such adjustment is not so great as where the racks are pivoted, as hitherto described.

It will thus be seen that the clamp or vise is one which may be very readily adjusted, since the jaws may be brought into suitable relation to one another or into contact with the object placed between them by a mere pressure upon the movable jaw, the only necessity for screwing the jaws together being after the required object has been contacted. The arrangement is one which enables objects, whether small or large, to be clamped, since the angular relation between the two jaws may be varied from parallel to a very much converging angle, thereby bringing the ends of the jaws into contact rather than the entire clamping-surface.

It will be understood that the terms "fixed" and "movable" are used only for the sake of convenience, and that, as a matter of fact, either jaw could be considered as a fixed jaw with respect to the other.

The vise or clamp can be used in connection with a carpenter's bench by setting it on end in the usual manner, in which case the jaws may be lengthened, if so desired.

What we regard as new, and desire to secure by Letters Patent, is—

1. In a vise or clamp, the combination of two jaws, two racks carried by one of the jaws one of the racks being adjustable with relation thereto, and gear-wheels within the opposite jaw meshing with the racks and pivotally mounted in a line out of perpendicular with respect to the plane of travel of the jaw, substantially as described.

2. In a vise or clamp, the combination of two jaws, two racks carried by one of the jaws one of the racks being transversely adjustable with respect thereto, two gear-wheels within the opposite jaw meshing with each other and with the respective racks and provided in their centers with pivotal holes and pivotal pins passing through the gear-wheels of a substantially less diameter than the pivotal holes, substantially as described.

3. In a vise or clamp, the combination of two jaws, two racks carried by one of the jaws one of the racks being transversely adjustable with respect thereto, two gear-wheels within the opposite jaw meshing with each other and with the respective racks and pivoted in a line out of perpendicular with the plane of travel of the jaw, and pivotal pins passing through holes in the gear-wheels, said pins being of a substantially less diameter than the holes, substantially as described.

4. In a vise or clamp, the combination of two jaws, two racks carried by one of the jaws one of the racks being transversely adjustable with respect thereto, gear-wheels within the opposite jaw meshing with each other and with the respective racks and pivotally mounted in a line out of perpendicular with the plane of travel of the jaw, substantially as described.

5. In a vise or clamp, the combination of a movable jaw, a rack pivoted near the end of the jaw, a screw-threaded shaft transversely adjustable within the jaw, a second rack pivotally connected to the end of the screw-threaded shaft and extending in substantially the same direction, a fixed jaw through which the two racks project, two gear-wheels revolubly mounted within the fixed jaw between the racks and in a line out of perpendicular with the plane of travel of the jaw, substantially as described.

6. In a vise or clamp, the combination of a movable jaw, a rack pivoted near the end of the jaw, a second rack pivotally connected to a screw-threaded shaft, an adjusting-head on the shaft revolubly mounted with respect to the jaw, a fixed jaw through which the racks project, two gear-wheels within the fixed jaw revolubly mounted between the racks meshing therewith and with each other, and pivotal pins mounted in a line out of perpendicular with the plane of travel of the jaw passing through holes in the gear-wheels, said holes being of substantially larger diameter than the diameter of the pivotal pins, substantially as described.

JOHN BLACK.
WILLIAM BLACK.

Witnesses:
   Geo. H. Madden,
   Dan C. Haskell.